2 Sheets—Sheet 1.

J. K. PROCTOR.

DRYING MACHINE.

No. 11,460. Reissued Dec. 25, 1894.

Witnesses:
Thomas M. Smith.
Richard C. Maxwell.

Inventor.
Josiah K. Proctor,
By J. Walter Douglass
Attorney.

2 Sheets—Sheet 2.
J. K. PROCTOR.
DRYING MACHINE.
No. 11,460. Reissued Dec. 25, 1894.
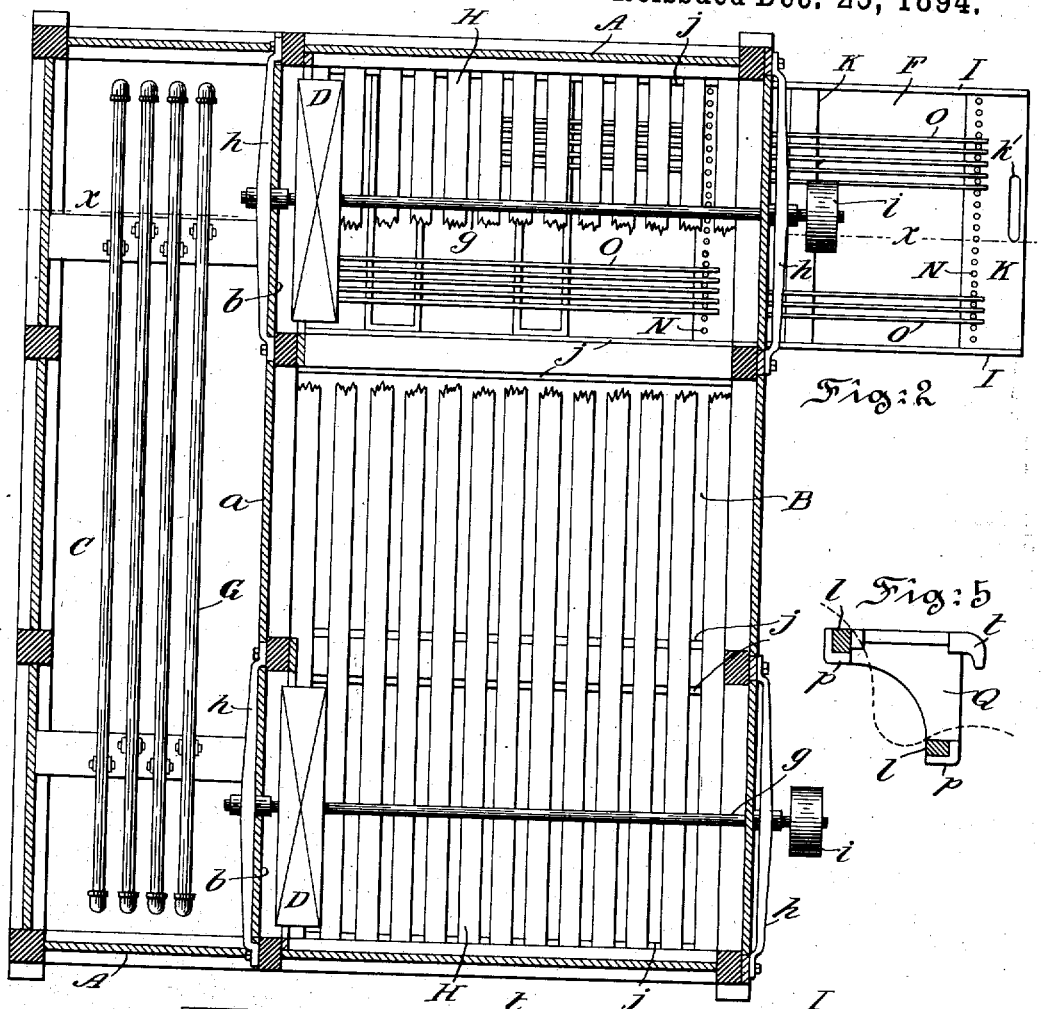
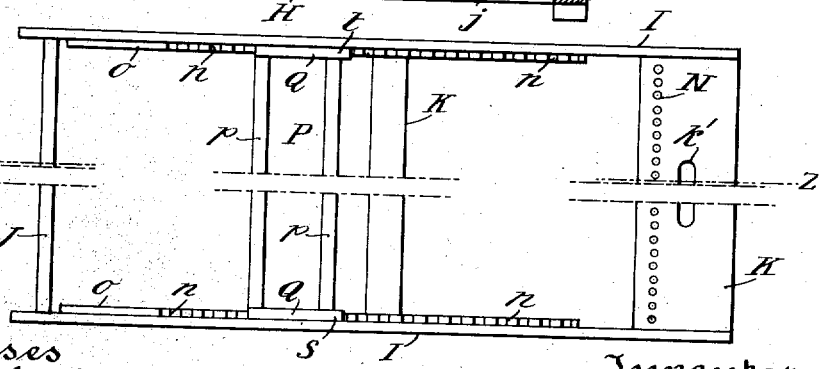
Witnesses
Thomas M. Smith.
Richard E. Maxwell.
Inventor.
Josiah K. Proctor,
By J. Walter Douglass
Attorney.

UNITED STATES PATENT OFFICE.

JOSIAH K. PROCTOR, OF PHILADELPHIA, PENNSYLVANIA, ASSIGNOR TO THE PHILADELPHIA TEXTILE MACHINERY COMPANY, OF SAME PLACE.

DRYING-MACHINE.

SPECIFICATION forming part of Reissued Letters Patent No. 11,460, dated December 25, 1894.

Original No. 502,237, dated July 25, 1893. Application for reissue filed October 9, 1894. Serial No. 525,438.

*To all whom it may concern:*

Be it known that I, JOSIAH K. PROCTOR, a citizen of the United States, residing at the city of Philadelphia, in the county of Philadelphia and State of Pennsylvania, have invented certain new and useful Improvements in Drying-Machines, of which the following is a specification.

My invention relates to a drying machine in which material to be dried is supported in an inclosure and the heat furnished by radiation to the air therein is mixed and diffused or circulated by induced air currents.

My invention while designed primarily for the drying of stockings stretched over forms or boards is not confined thereto, but has relation to any class of goods or materials susceptible of being supported in a somewhat similar manner within a drying inclosure or housing.

The principal object of my invention is to provide a simple, durable and effective drying machine having means for permitting of the quick and convenient placing of goods to be dried within an inclosure thereof and also for permitting of the removal when dry of the same therefrom.

The nature, characteristic features and scope of my invention will be more fully understood from the following description taken in connection with the accompanying drawings forming part hereof, and in which—

Figure 1:
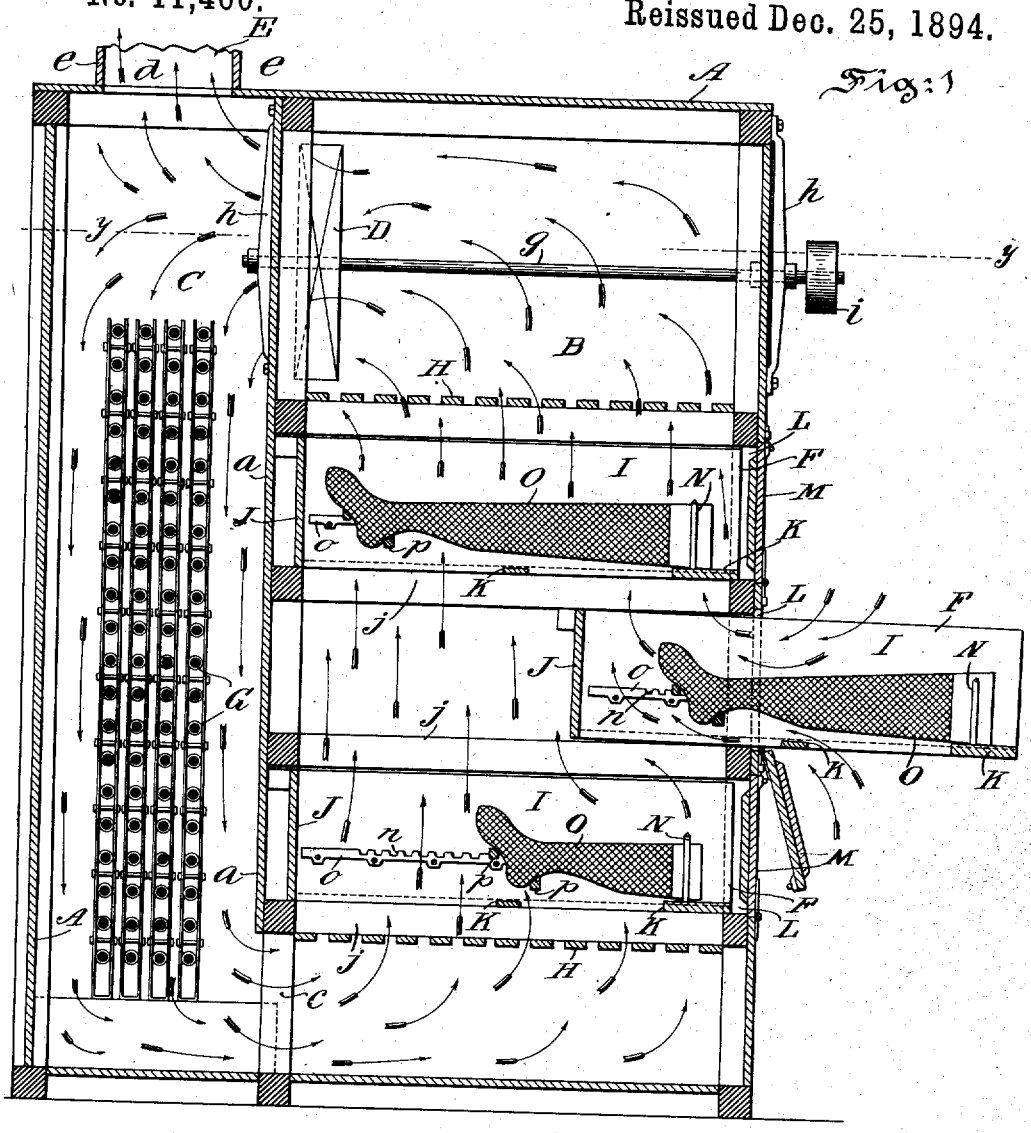
Figure 4:
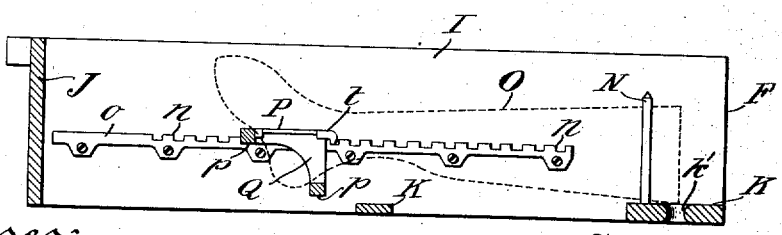

Figure 1, is a vertical longitudinal section of a drying machine embodying the features of my invention on the line *x x*, of Fig. 2. Fig. 2, is a horizontal section of the machine on the line *y y*, of Fig. 1. Fig. 3, is a plan view of one of the supporting devices for the goods to be dried of the machine. Fig. 4, is a vertical longitudinal section on the line *z z*, of Fig. 3; and Fig. 5, is a detail view in section of a portion of the supporting devices for the reception of goods to be dried in and by a machine of my invention.

The direction of the induced currents of air will be found indicated in Fig. 1, by means of arrows.

Referring to the drawings A, is the inclosure of the drying machine, having the usual side, end, top and bottom walls, and closed from all communication with the atmosphere except through the outlet *d*, in the top of the machine, which may be provided with walls *e*, to form a chute or flue E.

*a*, is an internal vertical partition dividing the inclosure A, into the drying and air heating compartments B and C. The compartments B and C, are in communication with each other through openings *b* and *c*, provided in the top and bottom of the partition *a*.

D, represents fans located in the upper part of the partition *a*, at or about the openings *b*, for circulating the air within the inclosure A, the currents of air produced by the fans passing continuously downward through the heating compartment C and upward through the drying compartment B. These fans are preferably, arranged vertically in the partition *a*, but any other arrangement of the fans may, be adopted, that will cause a circulation of the air in the manner indicated by the arrows in Fig. 1, of the drawings. One or more fans may be employed. Each of the fans D, is mounted on a shaft *g*, supported by suitable bearings *h*, and may be driven by belt-pulleys *i*, located outside of the inclosure A, or in any other preferred manner.

G, is a heating coil arranged within the compartment C, to heat the air circulated within the inclosure A. The opening *d*, in the top of the inclosure for the discharge or escape of the saturated air preferably leads from the heating compartment C; and the air discharged through the opening *d*, may be conducted out of the room in which the drying machine is located through the chute or flue E. The opening *d*, may, however, be located in any other more convenient part of the drying inclosure A, where air currents can be forced through it by the fan D; and, if more convenient, there may be two or more of such discharge openings for such purpose.

Arranged horizontally across the drying compartments B, are slotted or perforated partitions H, dividing the compartments into a series of divisions. The goods to be dried are placed in the division between the partitions H, and the other divisions constitute air distributing chambers as clearly shown in Fig. 1. The object of the partitions H, is to cause the air forced through the perforations or openings in said partitions to rise through the drying division of the compartments B in a more uniform and evenly distributed manner than it otherwise would do.

The goods within the machine are supported in properly constructed slides or drawers F, which are capable of being wholly or partially withdrawn, while the goods are being placed in position therein and also of being returned while the goods are being dried. These slides F, preferably consist of frames having side-pieces I, back-pieces J, and cross-braces K. The front cross-brace K, may be provided with an opening or handle $k'$, to permit of a movement of the slide F. The slide or drawer F, while in the machine rests upon the side cleats $j$, connected with the frame-work of the machine and these cleats serve also to guide the drawers, while being introduced or withdrawn from the apparatus.

The drawers F, are inserted or withdrawn from the machine through openings L, in the front wall of the inclosure A. These openings are provided with suitable covers or hinged doors M, adapted to permit the slides or drawers F, to be operated and are to be closed during the drying operation.

In the drawings the slides or drawers F, are all shown placed wholly within the machine with the covers or doors M, closed with the exception of one drawer, which is shown partially withdrawn from the inclosure A. In practice in placing the goods in the drawers, I prefer not to remove the drawers entirely from the machine, the extent of withdrawal being regulated by the length of the goods to be operated upon. When a drawer is within the inclosure A, and the door M, is closed over the end of the drawer no air can enter the inclosure around the drawer, but when the door M, is opened and the drawer or slide F, is partially withdrawn, the external air enters the opening L, as indicated by the arrows in Fig. 1, the same being drawn in by suction of the fans D. It will be observed, therefore, that no hot or damp air can escape from the inclosure A, into the room, in which the machine stands, but that external air from the room will be drawn into the machine, thus serving to ventilate the room by keeping it cool.

The slides or drawers F, are shown as fitted up for the support of stockings stretched over forms or boards. For the purpose of supporting the stocking boards, I provide the front of each drawer with a series of pins N, inserted in the front-brace K, and projecting upward therefrom. The stocking-boards and stockings O, are placed between adjacent pins N, and as many boards may be placed in one drawer as there are spaces between the said pins and as so arranged air may pass between adjacent boards O. To support the foot end of the stocking board, I provide a frame O, of peculiar construction such as illustrated in Figs. 3, 4 and 5. I prefer to make this frame of one single casting, in which case the frame consists of two end parts Q, united by cross-bars $p$. The end parts Q, of the frame P, are provided with lugs $s$ and $t$, which rest on horizontal side cleats $o$, carried by the inner surfaces of the sides of the drawers F. The frame P, is free to slide on its lugs, the whole extent afforded by the length of the cleats $o$, and may be adjusted to any position thereon. In order to prevent the frame P, from being displaced by jar or other accident, after once adjusted to position, the cleats $o$, may be provided with a series of notches $n$, to receive the lugs $s$ and $t$.

The cross-bars $p$, supporting the foot end of the stocking-board, when made of iron may be provided on their supporting edges with strips of wood $l$, so that the wet stockings may not contact with the metal, which might result in discoloring the stocking at the point of contact therewith. It is apparent that the same result may be obtained by constructing the supporting bars $p$, entirely of wood or of some other material not liable to injure the stocking.

The supports P, may be adjusted on their rests or cleats $o$, to or from the pins N, to suit the length of the stocking boards and stockings O, to be operated thereon. In Fig. 1, I have illustrated them adjusted for the reception of three different lengths of stockings. Any number of drawers or slides F, may be located in the division between the partitions H, that is, one above the other and side by side.

The operation of the hereinbefore described drying apparatus is as follows: The goods or material to be dried are placed in the slides or drawers F, and the drawers are introduced into the inclosure A, through the openings L. The doors M, are then closed and the drying is effected by the heated air caused to circulate by means of the fans D. When the goods are dry, the doors M, are opened and the drawers F, drawn outward sufficiently to permit of the removal of the dried goods. No precise order of filling the drawers F, need be observed, but any one of the drawers may, at any time, be withdrawn and replaced with goods to suit the necessity of the operator, or two or more drawers may be withdrawn at one and the same time. In practice several operators are assigned to one of the machines, and as it requires but a few minutes to dry the goods in any one drawer, but a very brief interval of time occurs, during which one or more drawers are not open. This being the case it has been found that for the successful practical operation of the machine, no special inlet is required for the introduction of air into the inclosure other than the inlets temporarily created by the opening of the doors during the time of the withdrawal of the drawers for the removal of dried goods therefrom. Such inlets, however, may be provided, if desired. It may be here remarked that the fans may be located at the bottom instead of at the top of the inclosure A, in which case the direction of the circulation of the air would be reversed from that as illustrated in Fig. 1, of the drawings. Instead of doors M, to close the openings through which the drawers F, slide the outward ends of the drawers may be made with a continuous front, so as to close up the opening, when a drawer is returned to position in the machine. These and other details of construction may be modified without departing from my invention and hence I do not wish to be understood as limiting myself to the precise details of construction and arrangement of the machine as hereinbefore described and illustrated in the drawings.

Having thus described the nature and objects of my invention, what I claim as new, and desire to secure by Letters Patent, is—

1. A drying machine provided with a slide or drawers, a frame for holding one of the ends of stocking forms or boards and means for adjusting the frame so as to accommodate the same to varying lengths of forms or boards, substantially as and for the purposes described.

2. A drying machine provided with communicating heating and air distributing compartments, slides or drawers located in the air distributing compartments, a frame for holding one of the ends of forms or boards adapted to receive goods, means for adjusting said frame so as to accommodate the same to different lengths of forms or boards and means for causing a circulation of the air through said compartments, substantially as and for the purposes described.

3. A drying machine provided with slides or drawers, a frame having downwardly projecting lugs at either end thereof in combination with notched cleats connected with the sides of the slides or drawers to permit of said frame being adjusted to and retained in different positions with respect to the front of the slides or drawers for holding boards or goods of different lengths, substantially as described.

4. In a drying machine provided with slides or drawers, a frame for holding a stocking form or board, and notched cleats connected with the sides of the slides or drawers, substantially as and for the purposes described.

5. In a drying machine provided with slides or drawers, a casing having hinged doors, an internal frame for holding stocking forms or boards and means for adjusting the same, substantially as and for the purposes described.

In testimony whereof I have hereunto set my signature in the presence of two subscribing witnesses.

JOSIAH K. PROCTOR.

Witnesses:
J. WALTER DOUGLASS,
THOMAS M. SMITH.